United States Patent
Jackson

(10) Patent No.: US 9,683,071 B2
(45) Date of Patent: Jun. 20, 2017

(54) RIGID POLYURETHANE FOAM

(71) Applicant: BASF SE, Ludwigshafen (DE)

(72) Inventor: Michael L. Jackson, Grosse Ile, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/136,278

(22) Filed: Dec. 20, 2013

(65) Prior Publication Data
US 2014/0179812 A1 Jun. 26, 2014

Related U.S. Application Data

(60) Provisional application No. 61/745,057, filed on Dec. 21, 2012.

(51) Int. Cl.
*C08G 18/66* (2006.01)
*C08J 9/14* (2006.01)
*C08G 18/42* (2006.01)
*C08G 101/00* (2006.01)

(52) U.S. Cl.
CPC ..... *C08G 18/6637* (2013.01); *C08G 18/4236* (2013.01); *C08G 18/6622* (2013.01); *C08J 9/141* (2013.01); *C08J 2101/0025* (2013.01); *C08J 2203/14* (2013.01); *C08J 2205/10* (2013.01); *C08J 2375/04* (2013.01)

(58) Field of Classification Search
CPC ............ C08G 18/4236; C08G 18/6622; C08G 18/6637; C08G 2101/0025; C08J 9/141; C08J 2203/14; C08J 2205/10; C08J 2375/04
See application file for complete search history.

(56) References Cited

U.S. PATENT DOCUMENTS

| | | | |
|---|---|---|---|
| 3,030,249 A | 4/1962 | Schollenberger et al. | |
| 3,765,928 A | 10/1973 | Smarook | |
| 5,686,500 A | 11/1997 | Fishback et al. | |
| 6,833,390 B2 * | 12/2004 | Haider | C08G 18/10 521/130 |
| 7,015,285 B2 | 3/2006 | Mhetar et al. | |
| 7,678,213 B1 * | 3/2010 | Loen | B32B 15/08 156/259 |
| 2006/0084709 A1 * | 4/2006 | Dobransky | C08G 18/4018 521/131 |
| 2006/0258762 A1 * | 11/2006 | Dobransky | C08G 18/4018 521/131 |
| 2012/0142799 A1 | 6/2012 | Gehringer et al. | |

FOREIGN PATENT DOCUMENTS

WO  WO 2007/092060 A1  8/2007
WO  WO 2010/062636 A1  6/2010

OTHER PUBLICATIONS

Kadkin, Oleg et al., "Polyester Polyols: Synthesis and Characterization of Diethylene Glycol Terephthalate Oligomers," Journal of Polymer Science, Part A: Polymer Chemistry, vol. 41, pp. 1114-1123 (2003).

* cited by examiner

*Primary Examiner* — John Cooney
(74) *Attorney, Agent, or Firm* — Howard & Howard Attorneys PLLC

(57) ABSTRACT

A rigid polyurethane foam includes the reaction product of an isocyanate and an isocyanate reactive component in the presence of a blowing agent. The isocyanate reactive component includes an aromatic polyester polyol, a rigid polyol, and an aliphatic polyester polyol. The rigid polyurethane foam has a tensile adhesion of greater than 35 kPa (5 psi) when disposed on a metal substrate or a polyester, polyurethane, or epoxy coated metal substrate, each having a substrate temperature of greater than 41° C. (105° F.), and tested in accordance with ASTM D1623-09. A method of forming a composite article comprising a substrate and the rigid polyurethane foam includes the steps of combining the isocyanate reactive component and the isocyanate in the presence of the blowing agent to form a reaction mixture and applying the reaction mixture to the substrate having a substrate temperature of greater than 41° C. (105° F.) to form the composite article.

20 Claims, No Drawings

RIGID POLYURETHANE FOAM

RELATED APPLICATIONS

This application is a nonprovisional of and claims priority to and all the advantages U.S. Provisional Application No. 61/745,057, which was filed on Dec. 21, 2012, the content of which is incorporated herein by reference.

FIELD OF THE DISCLOSURE

The instant disclosure generally relates to a rigid polyurethane foam which exhibits excellent adhesion to various substrates. The instant disclosure also relates to a composite article comprising the rigid polyurethane foam and a method of forming the composite article.

BACKGROUND OF THE DISCLOSURE

Commercial/residential entry and garage doors are typically produced by filling a cavity within a door ("door cavity") with various materials. One such material is polyurethane foam. The polyurethane foam improves the thermal and/or acoustic insulation properties of the door and also functions as a structural adhesive thereby improving the durability of the door.

A shell of the door ("door shell") typically defines the door cavity. To fill the door cavity with the polyurethane foam, a polyol, an isocyanate, and a blowing agent are combined to form a reaction mixture. The door shell is inserted into a press, and the reaction mixture is injected into the door cavity. Once injected, the reaction mixture contacts an inner surface of the door shell, is dispersed within the door cavity, and forms the polyurethane foam through a polyol-isocyanate reaction. The press restrains the door shell and prevents warping when the door cavity is filled with the polyurethane foam.

The area of the inner surface of the door shell which is initially contacted by the reaction mixture is known in the art as a "wet area". Polyurethane foams are known to exhibit poor adhesion in the wet area. That is, an adhesive bond between the polyurethane foam and the door shell tends to be weak and often results in delamination of the door shell from the polyurethane foam. Such delamination negatively impacts both the acoustic and the structural properties of the door.

In view of the foregoing, there remains a need to further improve upon existing polyurethane foams which are used to form composite articles such as doors. More specifically, there remains a need for a polyurethane foam which exhibits improved adhesion to various substrates and the wet areas thereon.

SUMMARY OF THE DISCLOSURE AND ADVANTAGES

A rigid polyurethane foam includes the reaction product of an isocyanate and an isocyanate reactive component in the presence of a blowing agent. The isocyanate reactive component includes an aromatic polyester polyol, a rigid polyol, and an aliphatic polyester polyol. The aliphatic polyester polyol is present in the isocyanate reactive component in an amount of from 2 to 10 parts by weight, based on 100 parts by weight of the total weight of the polyols present in the isocyanate reactive component. The rigid polyurethane foam has a tensile adhesion of greater than 35 kPa (5 psi) when disposed on a metal substrate, a polyester coated metal substrate, a polyurethane coated metal substrate, or an epoxy coated metal substrate, each having a substrate temperature of greater than 41° C. (105° F.), and tested in accordance with ASTM D1623-09.

A method of forming a composite article comprising a substrate and the rigid polyurethane foam includes the steps of providing the isocyanate reactive component, the isocyanate, and the blowing agent. The method also includes the steps of combining the isocyanate reactive component and the isocyanate in the presence of the blowing agent to form a reaction mixture and applying the reaction mixture to the substrate having a substrate temperature of greater than 41° C. (105° F.) to form the composite article comprising the substrate and the rigid polyurethane foam.

Advantageously, the rigid polyurethane foam tends to exhibit excellent adhesion to a substrate having a substrate temperature of greater than 41° C. (105° F.), especially to the area of the substrate which was initially contacted by the reaction mixture (the wet area). The adhesive bond between the rigid polyurethane foam and the substrate typically provides the composite article with excellent structural, insulative, and acoustic properties.

DETAILED DESCRIPTION OF THE DISCLOSURE

The instant disclosure includes a rigid polyurethane foam, a method of forming a composite article comprising a substrate and the rigid polyurethane foam, and a polyurethane system for use in forming the composite article. The rigid polyurethane foam includes the reaction product of an isocyanate and an isocyanate reactive component in the presence of a blowing agent.

In one embodiment, the rigid polyurethane foam also includes the reaction products of the isocyanate with itself. In this embodiment, the rigid polyurethane foam may include isocyanaurate groups, uretdione groups, carbodiimide groups, and combinations thereof. In one specific embodiment, the rigid polyurethane foam includes isocyanurate groups, i.e., includes both urethane groups and isocyanurate groups.

Typically, the rigid polyurethane foam of the subject disclosure is used for providing thermal and/or acoustic insulation properties for composite articles formed from molds having complex shapes, such as commercial/residential entry and garage doors. However, it is to be appreciated that the rigid polyurethane foam of the subject disclosure may be used for many other applications as well. The rigid polyurethane foam, the method of forming a composite article, and the polyurethane system are particularly useful for molding polyurethane foams in composite articles such as 6-paneled residential entry doors, interior doors, garage doors, and the like. In one embodiment, the composite article is further defined as a door. In this embodiment, the rigid polyurethane foam functions as an insulator, thermally and acoustically, and as a structural adhesive to provide the door with increased acoustic, insulative, and structural properties.

As used herein, the terminology "rigid polyurethane foam" describes a particular class of polyurethane foam and stands in contrast to flexible polyurethane foam. Rigid polyurethane foam is generally non-porous, having closed cells and minimal elastic characteristics, whereas flexible polyurethane foam is generally porous and has open cells.

Polyol selection impacts the stiffness of rigid polyurethane foams. Rigid polyurethane foams are typically produced from polyols having weight average molecular weights from about 250 to about 10,000 g/mol, hydroxyl numbers from about 20 to about 1,000 mg KOH/g. Moreover, rigid polyurethane foams are typically produced from polyols having high-functionality (f) initiators, i.e., f≥2, such as Mannich bases (f=4), toluenediamine (f=4), sorbitol (f=6), or sucrose (f=8). In contrast, flexible polyurethane foams are typically produced from polyols having higher molecular weights, lower hydroxyl numbers, and low-functionality initiators, i.e., f<4, such as dipropylene glycol (f=2) or glycerine (f=3). Rigid polyurethane foams are typically produced from polyfunctional polyols that create a three-dimensional cross-linked molecular structure which provides the rigid polyurethane foam with stiffness. Finally, rigid polyurethane foams are typically closed cell foams. The closed cells restrict the flow of air, noise, and heat/cold through the rigid polyurethane foam and also provide the rigid polyurethane foam with stiffness.

The rigid polyurethane foam of the subject disclosure may be open or closed celled and typically includes a highly cross-linked, polymer structure that provides excellent thermal and acoustic barrier properties, heat stability and flame resistance, and adhesive properties. Further, the rigid polyurethane foam typically has high compression strength at low density. The rigid polyurethane foam of the instant disclosure typically has a density of from 1.0 to 15.0, preferably 1.5 to 5.0, preferably 1.9 to 2.5, pounds per cubic foot (16 to 240, preferably 24 to 80, preferably 30 to 40, kg/m$^3$).

Thermal conductivity or k value is typically an indicator of the insulative/thermal barrier properties of an article such as the rigid polyurethane foam. Typically, the rigid polyurethane foam has a k value (Btu-inch/hour per ft$^2$ per ° F. at a 75° F. mean temperature) of from 0.1 to 0.2, alternatively from 0.13 to 0.17, alternatively from 0.14 to 0.16, alternatively about 0.15.

The rigid polyurethane foam includes the reaction product of the isocyanate and the isocyanate reactive component in the presence of the blowing agent, i.e., the isocyanate and the polyols of the isocyanate reactive component chemically react in the presence of the blowing agent. The instant disclosure also describes a polyurethane system comprising the isocyanate and the isocyanate reactive component. The system is typically provided in two or more discrete components, such as the isocyanate and the isocyanate reactive (or resin) component, i.e., as a two-component (or 2K) system, which is described further below. It is to be appreciated that reference to the isocyanate and isocyanate reactive component, as used herein, is merely for purposes of establishing a point of reference for placement of the individual components of the system, and for establishing a parts by weight basis. As such, it should not be construed as limiting the present disclosure to only a 2K system. For example, the individual components of the system can all be kept distinct from each other and mixed individually prior to application. As another example, a component typically included (and described herein as such) in the isocyanate reactive component may be mixed and used with the isocyanate.

The isocyanate reactive component includes polyols which are reactive with the isocyanate. More specifically, the isocyanate reactive component includes an aromatic polyester polyol, a rigid polyol, and an aliphatic polyester polyol.

The aromatic polyester polyol typically provides the rigid polyurethane foam with rigidity, energy efficiency, dimensional stability, and flame resistance. The aromatic polyester polyol is typically formed via the condensation of a glycol and a dicarboxylic acid or acid derivative. The functionality, structure, and molecular weight of the polyester polyol can be varied to tailor the processing characteristics of the polyurethane system and the physical properties of the rigid polyurethane to a particular application.

The aromatic polyester polyol typically has a functionality of greater than 2, alternatively from 2 to 5, alternatively from 2 to 4, alternatively from 2 to 3, alternatively about 2.6 and a weight-average molecular weight of from 500 to 5,000, alternatively from 1,000 to 3,000, alternatively from 1,500 to 2,500 g/mol. Further, the aromatic polyester polyol typically has a hydroxyl value of from 100 to 500, alternatively 200 to 400, alternatively 285 to 315, mg KOH/g.

The viscosity of the aromatic polyester polyol may vary with specific applications and application techniques. Said differently, higher and lower viscosity aromatic polyester polyols may be used to facilitate the application and the use of the polyurethane system. The aromatic polyester polyol typically has a viscosity at 25° C. of from 5,000 to 20,000, alternatively from 8,000 to 16,000, alternatively from 9,000 to 14,000, alternatively from 10,500 to 11,500, alternatively about 11,000, cps.

In one embodiment, the aromatic polyester polyol has a specific gravity of about 1.2 g/cm$^3$, a viscosity at 25° C. of about 11,000 cps, a functionality of about 2.6, and a hydroxyl number of about 300 mg KOH/g.

Suitable non-limiting aromatic polyester polyols are commercially available from BASF Corporation under the LUPRAPHEN® brand of polyols. The aromatic polyester polyol is typically present in the isocyanate reactive component in an amount of from 25 to 90, alternatively from 35 to 70, alternatively from 45 to 55, parts by weight, based on 100 parts by weight of the total weight of the polyols present in the isocyanate reactive component.

As described above, the isocyanate reactive component further includes the rigid polyol. The rigid polyol typically provides the rigid polyurethane foam with rigidity, energy efficiency, and dimensional stability. The rigid polyol typically has a high functionality. More specifically, the rigid polyol typically has a functionality of greater than 3, alternatively greater than 4, alternatively from 3 to 8, alternatively from 4 to 8, alternatively about 6.

The rigid polyol typically has a hydroxyl value of from 250 to 1,000, alternatively 300 to 800, alternatively 350 to 550, alternatively 360 to 380, alternatively 460 to 480, mg KOH/g.

The rigid polyol typically has a viscosity at 25° C. of from 1,000 to 50,000, alternatively from 10,000 to 30,000, alternatively from 20,000 to 30,000, alternatively from 24,000 to 26,000, alternatively from 24,500 to 25,500, cps.

The rigid polyol may be selected from the group of sucrose-initiated rigid polyols, amine-initiated rigid polyols, and combinations thereof. A suitable non-limiting sucrose-initiated or amine-initiated rigid polyol is typically produced by alkoxylation of an amine initiator or sucrose. Suitable non-limiting amine initiators include aromatic amines such as aniline, N-alkylphenylene-diamines, 2,4'-, 2,2'-, and 4,4'-methylenediamine, 2,6- or 2,4-toluenediamine, vicinal toluenediamines, o-chloro-aniline, p-aminoaniline, 1,5-diaminonaphthalene, methylene dianline, the various condensation products of aniline and formaldehyde, and the isomeric diaminotoluenes; and aliphatic amines such as mono-, di-, and trialkanolamines, ethylene diamine, propylene diamine, diethylenetriamine, methylamine, triisopropanolamine, 1,3-diaminopropane, 1,3- and 1-4 diaminobutane, and combinations thereof. Typical non-limiting amine initiators include monoethanolamine, vicinal toluenediamines, ethylenediamines, and propylenediamine. Further, the sucrose-initiated or amine-initiated rigid polyol is typically alkoxylated with ethylene oxide, propylene oxide, butylene oxide, and combinations thereof.

In one embodiment, the rigid polyol is a sucrose initiated rigid polyol having a specific gravity of about 1.1 g/cm$^3$, a viscosity at 25° C. of about 25,000 cps, a functionality greater than 6, and a hydroxyl number of about 370 mg KOH/g.

Suitable non-limiting rigid polyols are commercially available from BASF Corporation under the PLURACOL® brand of polyols including, particularly, the SG series of PLURACOL® polyols. The rigid polyol is typically present in the isocyanate reactive component in an amount of from 5 to 40, alternatively from 10 to 30, alternatively from 12 to 18, parts by weight, based on 100 parts by weight of the total weight of the polyols present in the isocyanate reactive component.

As described above, the isocyanate reactive component further includes the aliphatic polyester polyol. The aliphatic polyester polyol is typically formed via the condensation of a glycol and a dicarboxylic acid or acid derivative. The aliphatic polyester polyol typically provides the rigid polyurethane foam with excellent adhesion to metal substrates and coated metal substrates especially in areas of the substrate which are initially contacted by a reaction mixture comprising a mixture of the isocyanate reactive component and the isocyanate (the wet area). Suitable, non-limiting examples of metal substrates include cold rolled steel, stainless steel, aluminum, galvanized, galvanneal, and galvalum substrates. Suitable, non-limiting examples of coated metal substrates include polyester, polyurethane, and epoxy coated substrates. It is believed that the rigid polyurethane foam exhibits excellent adhesion to the substrate, including the wet area because of the aliphatic polyester polyol. Of course, the aliphatic polyester polyol also contributes to the rigid polyurethane foams rigidity, energy efficiency, and dimensional stability.

The aliphatic polyester polyol typically has a functionality of greater than 2, alternatively from 2 to 5, alternatively from 2 to 4, alternatively about 4 and a weight-average molecular weight of from 500 to 5,000, alternatively from 1,000 to 3,000, alternatively from 1,500 to 2,500 g/mol. Further, the aliphatic polyester polyol typically has a hydroxyl value of from 20 to 400, alternatively 30 to 200, alternatively 40 to 100, alternatively 50 to 60, mg KOH/g. Furthermore, the aliphatic polyester polyol typically has a viscosity at 25° C. of from 10,000 to 20,000, alternatively from 15,000 to 19,000, alternatively from 17,500 to 18,500, cps.

Suitable non-limiting aliphatic polyester polyols are commercially available from BASF Corporation under the LUPRAPHEN® brand of polyols. The aliphatic polyester polyol is typically present in the isocyanate reactive component in an amount of from 2 to 10, alternatively from 3 to 8, alternatively from 4 to 8, alternatively from 4 to 6, parts by weight, based on 100 parts by weight of the total weight of the polyols present in the isocyanate reactive component. The aliphatic polyester polyol and the aromatic polyester polyol are typically present in the isocyanate reactive component in a ratio of from 1:5 to 1:15, alternatively from 1:6 to 1:12.

The isocyanate reactive component may include one or more catalysts. The catalyst is typically present in the isocyanate reactive component to catalyze the reaction between the isocyanate and the polyols. It is to be appreciated that the catalyst is typically not consumed in the exothermic reaction between the isocyanate and the polyol. More specifically, the catalyst typically participates in, but is not consumed in, the exothermic reaction. The catalyst may include any suitable catalyst or mixtures of catalysts known in the art. Examples of suitable catalysts include, but are not limited to, gelation catalysts, e.g. amine catalysts in dipropylene glycol; blowing catalysts, e.g. bis(dimethylaminoethyl)ether in dipropylene glycol; and metal catalysts, e.g. tin, bismuth, lead, etc. One non-limiting example of a suitable catalyst is N,N-dimethylcyclohexylamine.

The isocyanate reactive component may include one or more surfactants. The surfactant typically supports homogenization of the blowing agent and the polyol and regulates a cell structure of the rigid polyurethane foam. The surfactant may include any suitable surfactant or mixtures of surfactants known in the art. Non-limiting examples of suitable surfactants include various silicone surfactants, salts of sulfonic acids, e.g. alkali metal and/or ammonium salts of oleic acid, stearic acid, dodecylbenzene- or dinaphthylmethane-disulfonic acid, and ricinoleic acid, foam stabilizers such as siloxaneoxyalkylene copolymers and other organopolysiloxanes, oxyethylated alkyl-phenols, oxyethylated fatty alcohols, paraffin oils, castor oil, castor oil esters, and ricinoleic acid esters, and cell regulators, such as paraffins, fatty alcohols, and dimethylpolysiloxanes. One specific, non-limiting example of a surfactant is a silicone-polyether block copolymer.

The isocyanate reactive component may also include one or more flame retardants. In the event of a fire, the flame retardant helps to retard fire progression of the rigid polyurethane foam. Suitable non-limiting examples of flame retardants include tris(1-chloro-2-propyl)phosphate (TCPP), tetrabromophthalate diol, tris(chloroisopropyl) phosphate, tricresyl phosphate, tris(2-chloroethyl) phosphate, tris(2,3-dibromopropyl) phosphate. In addition to halogen-substituted phosphates, the flame retardant may also include reactive hydroxyl groups. For example, the flame retardant can be a novolac polyol, which is different than the polyols described above. Novolac polyols are also known in the art as "novolac resin" or "phenolic polyol." In addition to halogen-substituted phosphates, it is also possible to use various other inorganic or organic flame retardants. One specific, non-limiting example of a flame retardant is TCPP.

The isocyanate reactive component may optionally include one or more additional additives. Suitable additives for purposes of the instant disclosure include, but are not limited to, chain-extenders, crosslinkers, chain-terminators, processing additives, adhesion promoters, anti-oxidants, defoamers, anti-foaming agents, water scavengers, molecular sieves, fumed silicas, ultraviolet light stabilizers, fillers, thixotropic agents, silicones, colorants, inert diluents, and combinations thereof. If included, the additive can be included in the isocyanate reactive component in various amounts.

Referring now to the isocyanate, the isocyanate may be, consist essentially of, comprise, or include a polyisocyanate having two or more functional groups, e.g. two or more NCO functional groups. Suitable isocyanates for purposes of the present disclosure include, but are not limited to, aliphatic and aromatic isocyanates. In various embodiments, the isocyanate is selected from the group of diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), and combinations thereof.

The isocyanate may be an isocyanate prepolymer. The isocyanate prepolymer is typically a reaction product of an isocyanate and a polyol and/or a polyamine. The isocyanate used in the prepolymer can be any isocyanate as described above. The polyol used to form the prepolymer is typically selected from the group of ethylene glycol, diethylene glycol, propylene glycol, dipropylene glycol, butane diol, glycerol, trimethylolpropane, triethanolamine, pentaerythritol, sorbitol, biopolyols, and combinations thereof. The polyamine used to form the prepolymer is typically selected from the group of ethylene diamine, toluene diamine, diaminodiphenylmethane and polymethylene polyphenylene polyamines, aminoalcohols, and combinations thereof. Suitable non-limiting examples of aminoalcohols include ethanolamine, diethanolamine, triethanolamine, and combinations thereof.

Specific isocyanates that may be used to prepare the rigid polyurethane foam include, but are not limited to, toluene diisocyanate; 4,4'-diphenylmethane diisocyanate; m-phenylene diisocyanate; 1,5-naphthalene diisocyanate; 4-chloro-1; 3-phenylene diisocyanate; tetramethylene diisocyanate; hexamethylene diisocyanate; 1,4-dicyclohexyl diisocyanate; 1,4-cyclohexyl diisocyanate, 2,4,6-toluylene triisocyanate, 1,3-diisopropylphenylene-2,4-diisocyanate; 1-methyl-3,5-diethylphenylene-2,4-diisocyanate; 1,3,5-triethylphenylene-2,4-diisocyanate; 1,3,5-triisopropyl-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2,4,6-triisocyanate; 1-ethyl-3,5-diisopropyl benzene-2,4,6-triisocyanate and 1,3,5-triisopropyl benzene-2,4,6-triisocyanate. Other suitable rigid polyurethane foams can also be prepared from aromatic diisocyanates or isocyanates having one or two aryl, alkyl, aralkyl or alkoxy substituents wherein at least one of these substituents has at least two carbon atoms.

Suitable non-limiting isocyanates are commercially available from BASF Corporation under the LUPRANATE® brand of isocyanates. The isocyanate typically has: a NCO content of from 25 to 33, alternatively from 30.5 to 32, alternatively from 31 to 31.5, alternatively about 31.0, alternatively about 31.5, alternatively about 31.3, weight percent; a nominal functionality of from 2 to 3.5, alternatively from 2.5 to 3.1, alternatively from 2.6 to 3.1, alternatively about 2.7, alternatively about 3.5, alternatively about 2.9; and a viscosity of from 60 to 2000, alternatively from 150 to 750, alternatively about 200, alternatively about 700, alternatively about 450, cps at 25° C. (77° F.).

In one embodiment the isocyanate comprises polymeric MDI. For example, a suitable isocyanate includes polymeric diphenylmethane diisocyanate, has a NCO content of about 31.5 weight percent, a nominal functionality of about 2.7, and a viscosity of about 200 cps at 25° C. (77° F.). As another example, a suitable isocyanate includes polymeric diphenylmethane diisocyanate, has a NCO content of about 31 weight percent, a nominal functionality of about 3, and a viscosity of about 700 cps at 25° C. (77° F.).

In one specific embodiment, the isocyanate includes polymeric diphenylmethane diisocyanate and has a NCO content of about 31.3 weight percent, a nominal functionality of about 2.9, and a viscosity of about 450 cps at 25° C. (77° F.).

The isocyanate and the isocyanate reactive component are reacted in the presence of a blowing agent to form the rigid polyurethane foam. The blowing agent may be a physical blowing agent, a chemical blowing agent, or a combination of a physical blowing agent and a chemical blowing agent.

The terminology physical blowing agent describes blowing agents that do not chemically react with the isocyanate and/or the isocyanate reactive component. The physical blowing agent can be a gas or liquid. The liquid physical blowing agent typically evaporates into a gas when heated, and typically returns to a liquid when cooled. One specific, non-limiting example of a physical blowing agent is cyclopentane.

The terminology chemical blowing agent describes blowing agents which chemically react with the isocyanate or with other components to release a gas for foaming. One specific, non-limiting example of a chemical blowing agent is water.

The blowing agent is typically present in the isocyanate reactive component in an amount of from 1 to 30, alternatively from 10 to 25, alternatively from 15 to 25, parts by weight, based on 100 parts by weight of the polyols present in the isocyanate reactive component.

In one embodiment the isocyanate reactive component includes both a physical and a chemical blowing agent. In another embodiment the isocyanate reactive component includes the physical blowing agent and the chemical blowing agent in a weight ratio of from 40:1 to 10:1. In yet another embodiment, the isocyanate reactive component includes about from 15 to 25 parts by weight cyclopentane and from 0.05 to 5 parts by weight water, based on 100 parts by weight of the polyols present in the isocyanate reactive component.

As set forth above, the instant disclosure also provides a method of forming a composite article comprising a substrate and the rigid polyurethane foam. The method includes the steps of providing the isocyanate reactive component, the isocyanate, and the blowing agent. The rigid polyurethane foam and the components used to form the rigid polyurethane foam are as described above.

The method also includes the steps of combining the isocyanate reactive component and the isocyanate in the presence of the blowing agent to form a reaction mixture and applying the reaction mixture to the substrate having a substrate temperature of greater than 41° C. (105° F.) to form the composite article comprising the substrate and the rigid polyurethane foam.

The composite article is typically defined as a door. However, it is to be appreciated that the composite article is not limited to doors, but may be utilized in other applications such as walls and other architectural support and/or design articles, such as molding. Further, it is to be appreciated that the composite article of the present disclosure is not limited to architectural applications, but rather may also be useful for other applications requiring improved flow of polyurethane compounds within molds and improved thermal and/or acoustic insulation properties, such as for example, appliances and motor vehicles.

The polyols of the isocyanate reactive component and the isocyanate are typically combined at an isocyanate index of from 100 to 500, alternatively from 110 to 250, alternatively from 170 to 200. The terminology isocyanate index is defined as the ratio of NCO groups in the isocyanate to hydroxyl groups in the isocyanate reactive component multiplied by 100. The isocyanate index can be varied based on the desired composition of the rigid polyurethane foam. For example, intermediate isocyanate indexes, e.g. 110 to 250, can be used to make the rigid polyurethane foam which is a hybrid polyurethane/polyisocyanurate. As another example, higher isocyanate indexes, e.g. greater 250, can be used to make the rigid polyurethane foam which is a predominately polyisocyanurate.

The rigid polyurethane foam of the instant disclosure may be combined by mixing the isocyanate and the isocyanate reactive component to form a mixture at ambient or at elevated temperatures, e.g. −12 to 66° C. (10 to 150° F.). More specifically, in one embodiment, the method includes the step of heating the isocyanate reactive component and the isocyanate to a temperature of from 21 to 54° C. (70 to 130° F.), alternatively from 27 to 32° C. (80 to 90° F.) prior to the step combining the isocyanate reactive isocyanate reactive component with the isocyanate. Once combined, the isocyanate and the isocyanate reactive component form a reaction mixture.

The substrate upon which the reaction mixture is applied may be any surface and may include one or more of any type of material, such as a metal (including alloys), coated metal, polymeric material, etc. Suitable, non-limiting examples of metal substrates include cold rolled steel, stainless steel, aluminum, galvanized, galvanneal, and galvalum substrates. Suitable, non-limiting examples of coated metal substrates include polyester, polyurethane, and epoxy coated substrates.

The substrate upon which the reaction mixture is applied is typically a door shell comprising metal or metal having a coating thereon. It is to be appreciated that the door shell may be for any type of door. For example, the door shell may be for a 6-paneled residential entry door, an interior door, a garage door, etc. In one embodiment, the substrate is a garage door shell comprising metal having a polyester coating disposed thereon.

It certain embodiments in which the rigid polyurethane foam is produced in a mold, e.g. to form a garage door, it is to be appreciated that the isocyanate and the isocyanate reactive component may be mixed to form the reaction mixture prior to disposing the mixture in the mold. For example, the reaction mixture may be poured into an open mold or the mixture may be injected into a closed mold. Alternatively, the isocyanate and the isocyanate reactive component may be mixed to form the mixture within the mold. In these embodiments, upon completion of the rigid polyurethane foaming reaction, the rigid polyurethane foam takes the shape of the mold. The rigid polyurethane foam may be produced in, for example, low pressure molding machines, low pressure slabstock conveyor systems, high pressure molding machines, including multi-component machines, high pressure slabstock conveyor systems, and/or by hand mixing.

The rigid polyurethane foam is tested for tensile adhesion in accordance with ASTM D1623. When the reaction mixture is applied to (poured on) on a polyester coated metal test substrate having a substrate temperature of greater than 23.9° C. (75° F.), 29.4° C. (85° F.), 35° C. (95° F.), 41° C. (105° F.), 46.1° C. (115° F.), 51.7° C. (125° F.), 60° C. (140° F.), and tested in accordance with ASTM D1623 the rigid polyurethane foam exhibits excellent adhesion to the substrate.

The rigid polyurethane foam typically has a tensile adhesion of greater than 5, alternatively greater than 15, alternatively greater than 30, psi when tested in accordance with ASTM D1623-09 on test specimens prepared on a polyester coated metal test substrate having a substrate temperature of greater than 41° C. (105° F.). The rigid polyurethane foam typically has a tensile adhesion of greater than 14, alternatively greater than 23, alternatively greater than 37, psi when tested in accordance with ASTM D1623-09 on test specimens prepared on a polyester coated metal test substrate having a substrate temperature of greater than 46.1° C. (115° F.). The rigid polyurethane foam typically has a tensile adhesion of greater than 22, alternatively greater than 27, alternatively greater than 35, psi when tested in accordance with ASTM D1623-09 on test specimens prepared on a polyester coated metal test substrate having a substrate temperature of greater than 51.7° C. (125° F.). The rigid polyurethane foam typically has a tensile adhesion of greater than 19, alternatively greater than 30, alternatively greater than 42, psi when tested in accordance with ASTM D1623-09 on test specimens prepared on a polyester coated metal test substrate having a substrate temperature of greater than 60° C. (140° F.). The tensile adhesion values set forth in the preceding paragraph may vary depending on the cohesive strength of the particular embodiment of rigid polyurethane foam which is being tested. That is, the rigid polyurethane foam typically exhibits about 100% cohesive failure (as is discussed in detail below) and as such, the tensile adhesion of the foam on the metal or coated metal substrate is typically corresponds to the cohesive strength of the particular embodiment of rigid polyurethane foam which is being tested.

The rigid polyurethane foam typically exhibits predominately cohesive failure when tested in accordance with ASTM D1623. That is, when the reaction mixture is applied to (poured on) on a polyester coated metal test substrate having a substrate temperature of greater than 23.9° C. (75° F.), 29.4° C. (85° F.), 35° C. (95° F.), 41° C. (105° F.), 46.1° C. (115° F.), 51.7° C. (125° F.), 60° C. (140° F.), and tested in accordance with ASTM D1623 the rigid polyurethane foam exhibits predominately cohesive failure. More specifically, when the test sample is tested the foam fails cohesively, i.e., the foam remains on the substrate but tears apart cohesively. The % cohesive failure is typically measured by determining the percentage of the total surface area of the substrate which, after testing, still has foam attached thereto. Foams having poor adhesion fail adhesively, i.e., the foam delaminates from the substrate without leaving any, or leaving a minimal, amount of foam attached to the substrate when tested.

The rigid polyurethane foam typically exhibits greater than 50, alternatively greater than 75, alternatively greater than 95, % cohesive failure when tested in accordance with ASTM D1623-09 on test specimens prepared on a polyester coated metal test substrate having a substrate temperature of greater than 41° C. (105° F.). The rigid polyurethane foam typically exhibits greater than 50, alternatively greater than 75, alternatively greater than 95, % cohesive failure when tested in accordance with ASTM D1623-09 on test specimens prepared on a polyester coated metal test substrate having a substrate temperature of greater than 46.1° C. (115° F.). The rigid polyurethane foam typically exhibits greater than 50, alternatively greater than 75, alternatively greater than 95, % cohesive failure when tested in accordance with ASTM D1623-09 on test specimens prepared on a polyester coated metal test substrate having a substrate temperature of greater than 51.7° C. (125° F.). The rigid polyurethane foam typically exhibits greater than 50, alternatively greater than 75, alternatively greater than 95, % cohesive failure when tested in accordance with ASTM D1623-09 on test specimens prepared on a polyester coated metal test substrate having a substrate temperature of greater than 60° C. (140° F.).

The following examples are intended to illustrate the instant disclosure and are not to be viewed in any way as limiting to the scope of the instant disclosure.

EXAMPLES

Examples 1 and 2 are rigid polyurethane foams formed using an aliphatic polyester polyol in accordance with the instant disclosure. Comparative Example 1 is a rigid polyurethane foam which is not formed using an aliphatic polyester polyol. As such, Comparative Example 1 is not formed in accordance with the instant disclosure and is included for comparative purposes. Examples 1 and 2 and Comparative Example 1 are formed using the isocyanate reactive components set forth below in Table 1. The physical properties of Examples 1 and 2 and Comparative Example 1, such as overall foam structure and adhesion to thermoplastic substrates, are set forth further below in Table 2.

The amounts in Table 1 are in percent by weight based on 100 percent by weight of the isocyanate reactive component. The isocyanate reactive components set forth in Table 1 are reacted at an isocyanate index of 190 to form the rigid polyurethane foam articles. As well known in the art, isocyanate index is a measure of an actual molar amount of isocyanate reacted with the polyols of isocyanate reactive component relative to a theoretical molar amount of isocyanate needed to react with an equivalent molar amount of the polyols and isocyanate index is calculated using the following formula:

$$\text{Isocyanate Index} = \left[\frac{\text{Actual amount of isocyanate used}}{\text{Theoretical amount of isocyanate required}}\right] \times 100$$

TABLE 1

Isocyanate Reactive Components

| Component | Comp. Ex. 1 (wt. %) | Ex. 1 (wt. %) | Ex. 2 (wt. %) |
|---|---|---|---|
| Polyol A | 55.600 | 53.600 | 51.600 |
| Polyol B | 15.000 | 15.000 | 15.000 |
| Polyol C | — | 2.000 | 4.000 |
| Flame Retardant | 9.000 | 9.000 | 9.000 |
| Surfactant | 2.000 | 2.000 | 2.000 |
| Solvent | 3.000 | 3.000 | 3.000 |
| Catalyst A | 0.300 | 0.300 | 0.300 |
| Catalyst B | 1.000 | 1.000 | 1.000 |
| Catalyst C | 0.400 | 0.400 | 0.400 |
| Physical Blowing Agent | 12.500 | 12.500 | 12.500 |
| Chemical Blowing Agent | 1.200 | 1.200 | 1.200 |
| Total | 100.000 | 100.000 | 100.000 |
| Isocyanate Index | 190 | 190 | 190 |

Polyol A is an aromatic polyester polyol having a specific gravity of about 1.2 g/cm$^3$, a viscosity at 25° C. of about 11,000 cps, a functionality of about 2.6, and a hydroxyl number of about 300 mg KOH/g.

Polyol B is a sucrose/glycerin rigid polyol having a specific gravity of about 1.1 g/cm$^3$, a viscosity at 25° C. of about 25,000 cps, a functionality greater than 6, and a hydroxyl number of about 370 mg KOH/g.

Polyol C is an aliphatic polyester polyol having a specific gravity of about 1.2 g/cm$^3$, a viscosity at 25° C. of about 11,000 cps, a functionality of about 2, and a hydroxyl number of about 55 mg KOH/g.

Flame Retardant is TCPP.

Catalyst A is a delayed-action trimerization catalyst.

Catalyst B is a delayed-action tertiary amine.

Catalyst C is N,N-dimethylcyclohexylamine.

Surfactant is a silicone-polyether block copolymer

Solvent is propylene carbonate.

Physical Blowing Agent A is cyclopentane.

Chemical Blowing Agent B is water.

Isocyanate is toluene diisocyanate.

Each of the isocyanate reactive components of Examples 1 and 2 and Comparative Example 1 are machine mixed to form a reaction mixture. The isocyanate reactive components and the isocyanate are mixed at a temperature of about 75° F. (23.9° C.) and at an isocyanate index of 190. In turn, the reaction mixture is applied to (poured on) the substrate having a substrate temperature of greater than 41° C. (105° F.), 46.1° C. (115° F.), 51.7° C. (125° F.), 60° C. (140° F.), to form the samples of composite articles comprising the substrate and the rigid polyurethane foam of that particular Example. As such, the rigid polyurethane foams of Examples 1-6 and Comparative Examples 1 and 2 are formed.

The samples of Examples 1 and 2 and Comparative Example 1 are tested to determine density at 25° C. and 50% relative humidity in accordance with ASTM D3574 and for tensile adhesion in accordance with ASTM D1623. The test results are set forth below in Table 2.

TABLE 2

| | | Metal Temperature | | | |
|---|---|---|---|---|---|
| | | 41° C. (105° F.) | 46.1° C. (115° F.) | 51.7° C. (125° F.) | 60° C. (140° F.) |
| Comp. Ex. | Core Density (lbs/ft$^3$) | 1.960 | 2.000 | 1.990 | 2.020 |
| | Section Density (lbs/ft$^3$) | 2.140 | 2.140 | 2.180 | 2.200 |
| | Ten Sub Adhesion (psi) | 4.900 | 10.133 | 23.533 | 12.000 |
| | Failure Mode (Adhesive/Cohesive Failure) | Adhesive | Adhesive | Cohesive | Adhesive |
| Ex. 1 | Core Density (lbs/ft$^3$) | 1.910 | 1.920 | 1.940 | 1.930 |
| | Section Density (lbs/ft$^3$) | 2.100 | 2.110 | 2.120 | 2.090 |
| | Ten Sub Adhesion (psi) | 5.200 | 14.300 | 22.900 | 19.100 |
| | Failure Mode (Adhesive/Cohesive Failure) | Adhesive | Adhesive | Cohesive | Cohesive |
| Ex. 2 | Core Density (lbs/ft$^3$) | 2.140 | 2.150 | 2.200 | 2.270 |
| | Section Density (lbs/ft$^3$) | 2.300 | 2.290 | 2.330 | 2.420 |
| | Ten Sub Adhesion (psi) | 30.767 | 37.033 | 35.633 | 42.533 |
| | Failure Mode (Adhesive/Cohesive Failure) | Cohesive | Cohesive | Cohesive | Cohesive |

Referring now to Table 2, the rigid polyurethane foams of Examples 1 and 2 exhibit excellent adhesion to the substrate at temperatures as low as 41° C. (105° F.). In clear contrast to Examples 1 and 2, the rigid polyurethane foam of Comparative Example 1 exhibits less adhesion to the substrate at 41° C. (105° F.), 46.1° C. (115° F.), 51.7° C. (125° F.), and 60° C. (140° F.). As such, the aliphatic polyether polyol provides improved adhesion to the substrate at all temperatures. Notably, the adhesion of Examples 1 and 2 does not drop off at 60° C. (140° F.) like the adhesion of Comparative Example 1. As such the adhesion of the foam of the subject disclosure is robust or excellent over a wide range of temperatures.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the instant disclosure independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the instant disclosure, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The instant disclosure has been described in an illustrative manner, and it is to be understood that the terminology which has been used is intended to be in the nature of words of description rather than of limitation. Obviously, many modifications and variations of the instant disclosure are possible in light of the above teachings. It is, therefore, to be understood that within the scope of the appended claims, the instant disclosure may be practiced otherwise than as specifically described.

What is claimed is:

1. A composite article comprising:
   a substrate selected from a polyester coated metal substrate or an epoxy coated metal substrate; and
   a rigid polyurethane foam comprising the reaction product of:
   (A) an isocyanate reactive component comprising;
      (i) an aromatic polyester polyol, said aromatic polyester polyol is present in said isocyanate reactive component in an amount of from 35 to 70 parts by weight, based on 100 parts by weight of the total weight of said polyols present in said isocyanate reactive component;
      (ii) a rigid polyether polyol having a functionality of greater than 3 and a hydroxyl value of from 250 to 1,000 mg KOH/g, said rigid polyether polyol is present in said isocyanate reactive component in an amount of from 10 to 30 parts by weight, based on 100 parts by weight of the total weight of said polyols present in said isocyanate reactive component; and
      (iii) an aliphatic polyester polyol, said aliphatic polyester polyol is present in said isocyanate reactive component in an amount of from 2 to 10 parts by weight, based on 100 parts by weight of the total weight of said polyols present in said isocyanate reactive component; and
   (B) an isocyanate;
   in the presence of
   (C) a blowing agent;
   wherein said composite article comprising said rigid polyurethane foam and said substrate, has a tensile adhesion of greater than 35 kPa (5 psi) when tested at a substrate temperature of greater than 41° C. (105° F.) and in accordance with ASTM D1623-09.

2. A composite article as set forth in claim 1 wherein said aliphatic polyester polyol is present in said isocyanate reactive component in an amount of from 4 to 8 parts by weight, based on 100 parts by weight of the total weight of said polyols present in said isocyanate reactive component.

3. A composite article as set forth in claim 1 wherein said aliphatic polyester polyol has a weight-average molecular weight of from 500 to 5,000 g/mol.

4. A composite article as set forth in claim 1 wherein said aliphatic polyester polyol has a functionality of from 2 to 5.

5. A composite article as set forth in claim 1 wherein said aromatic polyester polyol is present in said isocyanate reactive component in an amount of from 45 to 55 parts by weight, based on 100 parts by weight of the total weight of said polyols present in said isocyanate reactive component.

6. A composite article as set forth in claim 1 wherein said aromatic polyester polyol has a functionality of from 2 to 5.

7. A composite article as set forth in claim 1 wherein said rigid polyether polyol is present in said isocyanate reactive component in an amount of from 12 to 18 parts by weight, based on 100 parts by weight of the total weight of said polyols present in said isocyanate reactive component.

8. A composite article as set forth in claim 1 wherein said rigid polyether polyol has a functionality of from 3 to 8.

9. A composite article as set forth in claim 1 wherein said isocyanate comprises polymeric diphenylmethane diisocyanate and has an NCO content of from 30.5 to 32 weight percent, a nominal functionality of from 2.6 to 3.1, and a viscosity of from 150 to 750 cps at 25° C. (77° F.).

10. A composite article as set forth in claim 1 wherein said blowing agent comprises cyclopentane.

11. A composite article as set forth in claim 10 wherein said blowing agent further comprises water.

12. A composite article as set forth in claim 1 wherein said blowing agent comprises a physical blowing agent and a chemical blowing agent in a weight ratio of from 40:1 to 10:1.

13. A composite article as set forth in claim 1 having a density of from 16 to 240 kg/m³ (1 to 15 pcf).

14. A composite article as set forth in claim 1 having tensile adhesion of greater than 207 kPa (30 psi) when disposed on said polyester coated metal substrate having a substrate temperature of greater than 41° C. (105° F.), and tested in accordance with ASTM D1623-09.

15. A method of forming a composite article comprising a polyester coated metal substrate or an epoxy coated metal substrate, and a rigid polyurethane foam, said method including the steps of:
  (A) providing an isocyanate reactive component comprising;
    (i) an aromatic polyester polyol, the aromatic polyester polyol is present in the isocyanate reactive component in an amount of from 35 to 70 parts by weight, based on 100 parts by weight of the total weight of the polyols present in the isocyanate reactive component;
    (ii) a rigid polyether polyol having a functionality of greater than 3 and a hydroxyl value of from 250 to 1,000 mg KOH/g, the rigid polyether polyol is present in the isocyanate reactive component in an amount of from 10 to 30 parts by weight, based on 100 parts by weight of the total weight of the polyols present in the isocyanate reactive component; and
    (iii) an aliphatic polyester polyol, the aliphatic polyester polyol is present in the isocyanate reactive component in an amount of from 2 to 10 parts by weight, based on 100 parts by weight of the total weight of the polyols present in the isocyanate reactive component;
  (B) providing an isocyanate;
  (C) providing a blowing agent;
  (D) combining the isocyanate reactive component and the isocyanate in the presence of the blowing agent to form a reaction mixture; and
  (E) applying the reaction mixture to the substrate having a substrate temperature of greater than 41° C. (105° F.) to form the rigid polyurethane foam and the composite article comprising the substrate and the rigid polyurethane foam;
  wherein the composite article comprising the rigid polyurethane foam and the substrate, has a tensile adhesion of greater than 35 kPa (5 psi) when tested at a substrate temperature of greater than 41° C. (105° F.) and in accordance with ASTM D1623-09.

16. A method as set forth in claim 15 wherein the aliphatic polyester polyol is present in the isocyanate reactive component in an amount of from 4 to 8 parts by weight, based on 100 parts by weight of the total weight of the polyols present in the isocyanate reactive component.

17. A method as set forth in claim 15 wherein the aliphatic polyester polyol and the aromatic polyester polyol are present in the isocyanate reactive component in a weight ratio of from 1:5 to 1:15.

18. A method as set forth in claim 15 the isocyanate reactive component and the isocyanate are reacted at an isocyanate index of from 100 to 500.

19. A method as set forth in claim 15 wherein the substrate is a door shell.

20. A method as set forth in claim 15 further comprising the step of heating the isocyanate reactive component and the isocyanate to a temperature of from 21 to 54° C. (70 to 130° F.) prior to the step combining the isocyanate reactive component with the isocyanate.

* * * * *